US012716764B1

(12) United States Patent
Guenthner et al.

(10) Patent No.: US 12,716,764 B1
(45) Date of Patent: Aug. 25, 2026

(54) SENSOR-BASED CONTAINER FILL LEVEL MEASUREMENT SYSTEM

(71) Applicant: Samsara Inc., San Francisco, CA (US)

(72) Inventors: Casey Jack Guenthner, Seattle, WA (US); Henry Yifei Qin, San Francisco, CA (US); Troy Anthony Lanigan, Pasadena, CA (US); Jeffrey Mehlman, Pleasonton, CA (US); Javier Delgado, Fair Lawn, NJ (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 19/231,295

(22) Filed: Jun. 6, 2025

(51) Int. Cl.
*G01F 17/00* (2006.01)
*G01F 23/80* (2022.01)

(52) U.S. Cl.
CPC .................................. *G01F 23/802* (2022.01)

(58) Field of Classification Search
CPC ....................................................... G01F 17/00
See application file for complete search history.

(56) References Cited

U.S. PATENT DOCUMENTS 4,583,170 A * 4/1986 Carlin ..................... E21B 43/12
700/83
9,522,743 B1 * 12/2016 Tolani ..................... G01D 9/28
9,646,502 B1 * 5/2017 Gentry .................... G06F 21/44
2009/0222354 A1 * 9/2009 Murphy ............. G06V 30/1456
382/229
2015/0120515 A1 * 4/2015 Stevenson ............... G01F 22/02
705/28
2021/0312349 A1 * 10/2021 Webb .................. G06Q 10/067

* cited by examiner

*Primary Examiner* — John E Breene
*Assistant Examiner* — Alex T Devito
(74) *Attorney, Agent, or Firm* — Schwegman Lundberg & Woessner, P.A.

(57) ABSTRACT

A system for determining vessel fill percentages using sensor technologies. The system receives a sensor type selection through a graphical user interface at a client device, displays a request for vessel configuration information based on the selection, and configures a lookup table using the received configuration data. When measurement data is received from the sensor device, the system determines the vessel's fill percentage by applying the lookup table to transform raw sensor readings into accurate fill levels, then displays the fill percentage with a vessel identifier. The system accommodates various vessel shapes, dimensions, and configuration parameters including strapping charts, while supporting multiple measurement data types such as distance, pressure, temperature, voltage, current, and magnetic flux. This unified framework enables standardized monitoring across vessel types through a single interface.

17 Claims, 9 Drawing Sheets

SENSOR-BASED CONTAINER FILL LEVEL MEASUREMENT SYSTEM

TECHNICAL FIELD

Embodiments of the present disclosure relate generally to the field of industrial measurement systems, and more specifically, to remote monitoring systems that interpret and transform sensor data into operational information.

BACKGROUND

Vessel monitoring systems are widely deployed in industrial settings to track inventory, manage supply chains, and monitor remote assets. These systems use various sensor technologies, including radar, ultrasonic, optical, pressure, temperature, voltage, current, and magnetic flux sensors, to measure and report fill levels of containers such as tanks, silos, and other storage vessels.

A technical problem exists in measuring and determining fill levels across vessels with varying configurations. While sensors can detect raw measurements like distance, voltage, or pressure from vessels, no reliable method exists for converting these measurements into fill percentages across different vessel types. This limitation particularly affects vessels in remote locations where manual measurement is not feasible. The challenge is compounded when vessels have irregular geometries or when multiple measurement parameters are required, such as both pressure and temperature readings for pressurized tanks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
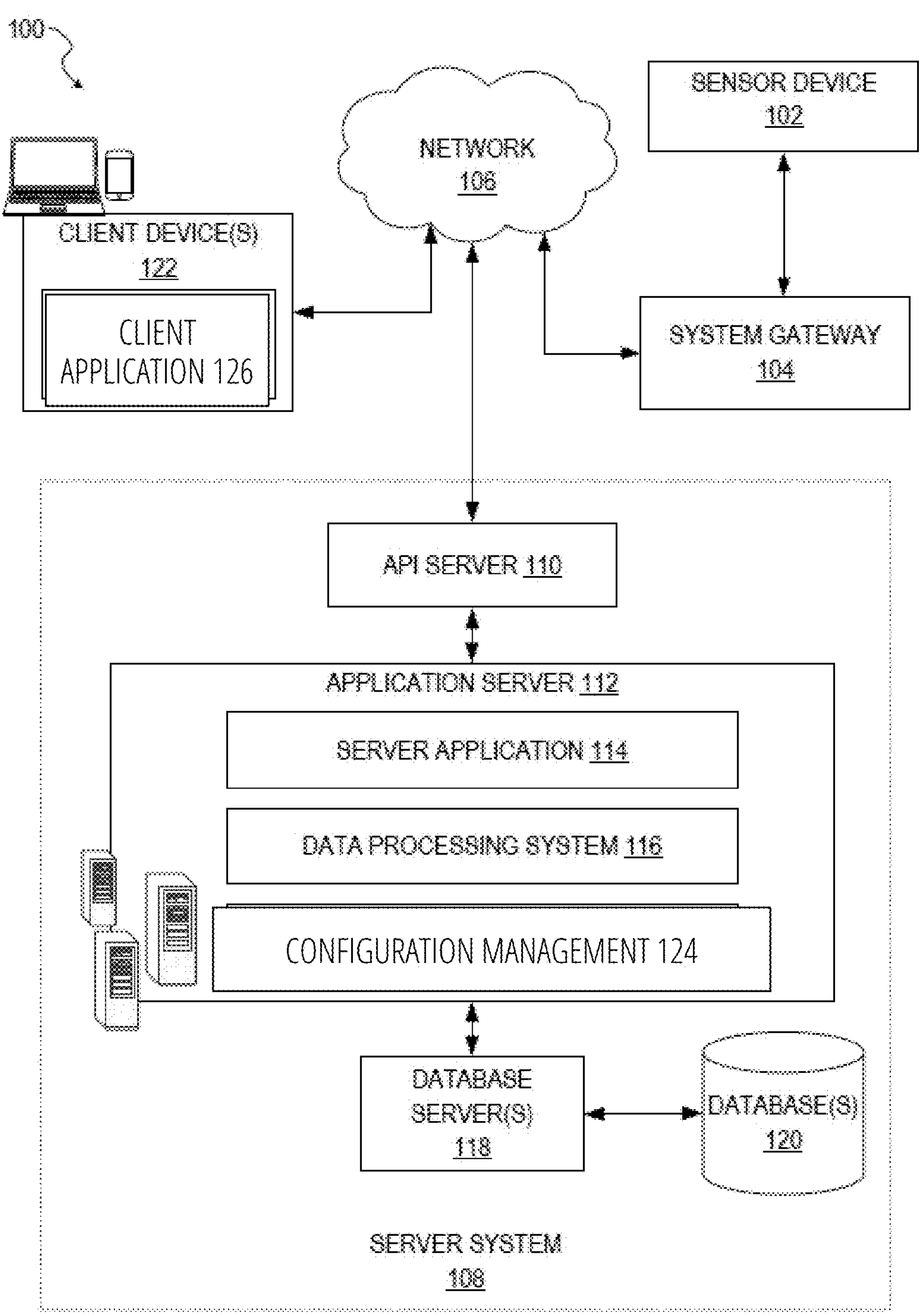
FIG. 1 is a block diagram showing an example system for determining vessel fill levels over a network, according to some examples.

A technical problem exists in measuring and determining fill levels across vessels with varying configurations. While sensors detect raw measurements like distance, voltage, or pressure from vessels, no reliable method exists for converting these measurements into fill percentages across different vessel types. This limitation particularly affects vessels in remote locations where manual measurement is not feasible.

According to certain examples, the disclosed invention comprises a system for integrating sensor devices with configuration and processing capabilities. Upon selection of a sensor type through the graphical user interface (GUI), the system displays specific requests for vessel configuration information tailored to that sensor type.

In certain examples, the system comprises one or more sensor devices for measuring different parameters: radar sensors and ultrasonic sensors for distance measurements, optical time-of-flight sensors for precise distance detection, pressure and temperature sensors for pressurized vessels, voltage and current sensors for electrical measurements, magnetic flux sensors for float-based measurements, and digital input sensors for automated readings.

The system configures lookup tables using vessel-specific information. Through the GUI, users input parameters that include vessel dimensions, shapes, strapping chart information, total volume capacity, zone configurations, and tank type. These parameters enable the system to establish correlations between sensor measurements and fill percentages.

In some examples, for vessels with strapping charts, the system may receive one or more images of strapping charts through a GUI presented at a client device. The system detects measurement values and corresponding fill levels from the image, and generates a comma-separated values (CSV) file containing these extracted data points. The system may then configure a lookup table that maps the measurement values to fill levels, and store the lookup table within a database.

In some examples, the system employs artificial intelligence analysis of vessel images. The AI system identifies vessel characteristics from uploaded images, determines vessel configuration parameters based on these characteristics, selects appropriate vessel configuration information, and configures the lookup table accordingly.

In some examples, the system implements encryption protocols. This includes retrieving encryption keys associated with specific sensor devices, transmitting these keys to client devices, receiving encrypted measurement data from sensors, decrypting the data using the corresponding keys, and then determining fill percentages based on the decrypted measurements.

In some examples, the system implements an encryption key management protocol. For example, each sensor device maintains a unique private key certificate used for encrypting measurement data. The system manages key distribution through a centralized server that authenticates both sensor devices and client devices before facilitating secure key exchange For example, a key management system may support multiple concurrent client device connections while maintaining distinct encryption channels for each sensor-client pairing. When a new client device requests access to sensor data, the system validates the device credentials, retrieves the appropriate sensor encryption keys from secure storage, and establishes a dedicated encrypted communication channel.

Following configuration, the system may access a database containing lookup tables associated with specific sensor devices and vessel configuration. The system processes incoming measurement data, which may include distance values, pressure readings, temperature measurements, voltage levels, current readings, or magnetic flux measurements by retrieving the relevant lookup table from the database based on attributes that include sensor identification information and vessel parameters. The system applies vessel-specific lookup tables to convert these measurements into accurate fill percentages.

The system tracks total volume of vessel contents based on calculated fill percentages and vessel configuration information, and may continuously monitor changes in total volume to identify specific content ingress and egress events to generate reports that indicate patterns of fill volume over time.

In some examples, the system enables real-time monitoring through a "live mode" feature, activated after an encryption key exchange between the mobile device and a sensor device. For example, when a user attempts to monitor vessel levels in real-time through a mobile device, the system retrieves an encryption key associated with the specific sensor device. This key is then transmitted to the authorized mobile client device. The sensor device may encrypt the measurement data using its private key certificate. Real-time monitoring becomes available only after this complete encryption key exchange process is successfully completed between the mobile device and sensor.

In some examples, the system presents processed data through the GUI, displaying fill percentages alongside vessel identifiers. This interface provides visualization of fill levels across multiple vessels, for monitoring and management.

FIG. 1 is a block diagram showing an example system 100 for determining vessel fill levels over a network 106, according to some examples. The system 100 includes one or more client devices 122 that host a number of applications including a client application 126.

Accordingly, each client application 126 is able to communicate and exchange data with another client application 126 and with the server application 114 executed at the server system 108 via the network 106. The data exchanged between client applications 126, and between a client application 126 and the server system 108, includes functions (e.g., commands to invoke functions) as well as payload data (e.g., sensor measurements, vessel configuration information, fill percentages).

The server system 108 provides server-side functionality via the network 106 to a particular client application 126, and in some examples to sensor devices 102 and the system gateway 104. While certain functions of the system 100 are described herein as being performed by either a client application 126, the sensor devices 102, the system gateway 104, or by the server system 108, it will be appreciated that the location of certain functionality either within the client application 126 or the server system 108 is a design choice. For example, it may be technically preferable to initially deploy certain technology and functionality within the server system 108, but to later migrate this technology and functionality to the client application 126, or one or more processors of the sensor devices 102, or system gateway 104, where there may be sufficient processing capacity.

The server system 108 supports various services and operations that are provided to the client application 126. Such operations include transmitting data to, receiving data from, and processing data generated by the client application 126, the sensor devices 102, and the system gateway 104. In some examples, the sensor devices 102 may include radar sensors, ultrasonic sensors, optical time-of-flight sensors, pressure sensors, temperature sensors, voltage sensors, current sensors, magnetic flux sensors, or digital input sensors. In some examples, this data includes measurement values, vessel configuration information, encryption keys, strapping chart data, and fill percentages. Data exchanges within the system 100 are invoked and controlled through functions available via graphical user interfaces (GUIs) of the client application 126.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data associated with data generated by the sensor devices 102 and processed by the application server 112.

Dealing specifically with the API Server 110, this server receives and transmits data (e.g., measurement data, vessel configuration information, fill percentages) between the client device 122 and the application server 112. Specifically, the API Server 110 provides a set of interfaces (e.g., routines and protocols) that can be called or queried by the client application 126 in order to invoke functionality of the application server 112. The API Server 110 exposes various functions supported by the application server 112, including sensor type selection, vessel configuration, strapping chart processing, lookup table generation, fill percentage determination, and the setting of encryption keys for secure sensor device 102 communications.

The application server 112 hosts a number of applications and subsystems, including a server application 114, and a configuration management 124. According to certain examples, the configuration management 124 is configured to perform operations that include: receiving sensor type selections through the client application 126, causing display of requests for vessel configuration information based on selected sensor types, receiving vessel configuration information that may include vessel dimensions, vessel shapes, strapping chart information, total volume capacity, zone configurations, and tank types, configuring lookup tables based on the vessel configuration information, processing measurement data from sensor devices 102 determining fill percentages based on measurement data and configured lookup tables, and causing display of fill percentage presentations at client devices 122.

The server application 114 implements a number of data processing technologies and functions, particularly related to the aggregation and other processing of data (e.g., measurement data generated by the sensor devices 102). As will be described in further detail, the measurement data, including distance values, pressure readings, temperature measurements, voltage levels, current readings, and magnetic flux measurements, generated by the sensor devices 102 may be aggregated into collections associated with particular vessels. Other processor and memory intensive processing of data may also be performed server-side by the server application 114, in view of the hardware requirements for such processing.

The application server 112 is communicatively coupled to a database server 118, which facilitates access to a database 120 in which is stored data associated with vessel configuration information, lookup tables, measurement data generated by the sensor devices 102, and fill percentages processed by the data processing system 116.

Figure 2:
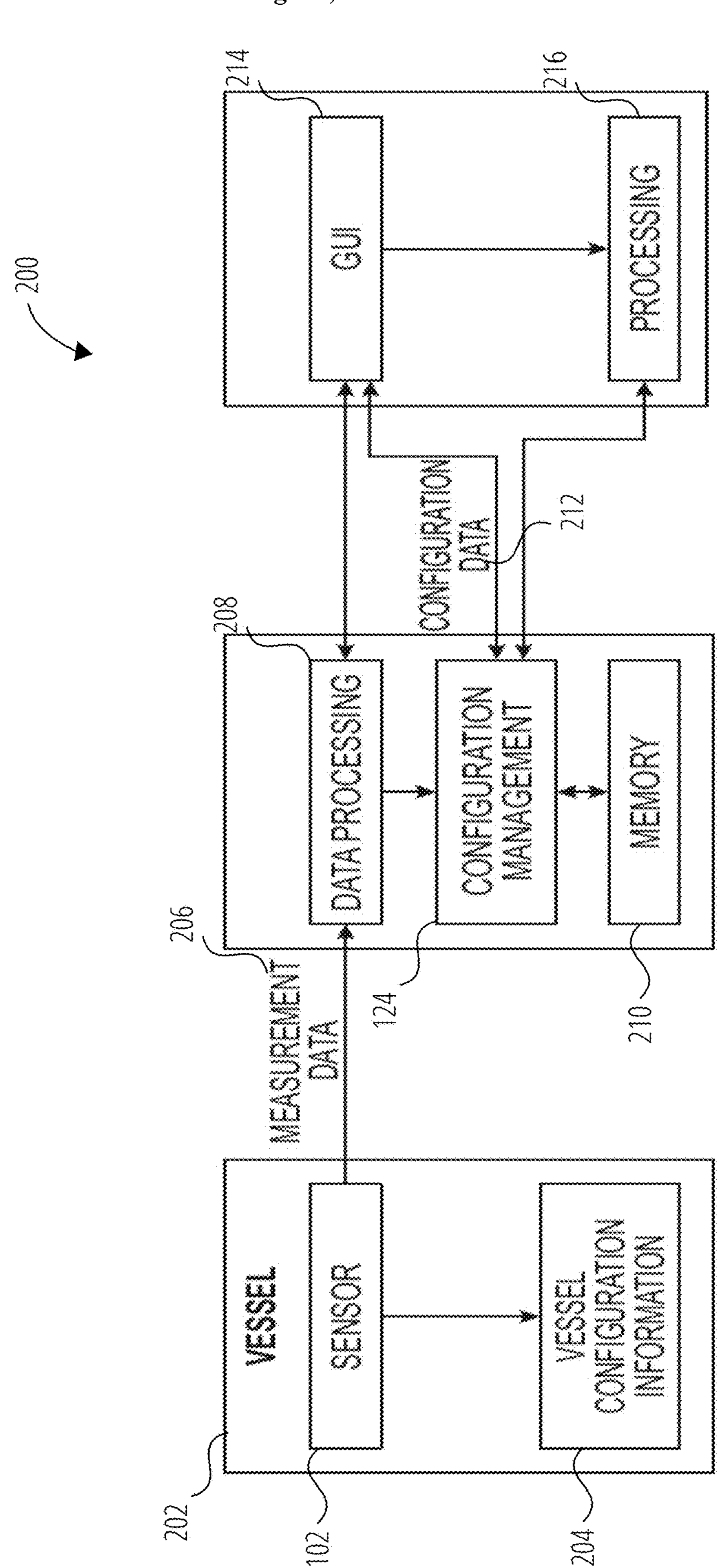
FIG. 2 is a system diagram illustrating functional components of a vessel monitoring system, according to some examples.

FIG. 2 is a system diagram illustrating functional components of a vessel 202 monitoring system, according to some examples. According to certain examples, the vessel monitoring system 200 comprises a plurality of interconnected components that operate together to determine and display vessel 202 fill levels.

The vessel monitoring system 200 includes a vessel 202 which houses contents for which fill levels are monitored. The vessel 202 may be a tank, silo, container, or other storage structure of various geometrical configurations. A sensor device 102 is positioned in communication with the vessel 202 and generates measurement data 206 corresponding to physical parameters of the vessel 202 contents. The sensor device 102 interfaces directly with the vessel 202 and transmits the measurement data 206 to the data processing 208 through communication protocols.

The measurement data 206 comprises raw sensor device 102 readings which may include distance values, pressure values, temperature values, voltage readings, current measurements, or magnetic flux measurements. In some examples, the measurement data 206 includes multiple parameter types when multi-dimensional mapping is required, such as when both pressure and temperature are needed to determine fill levels in pressurized tanks. In some examples, the system 100 processes multi-dimensional input data from sensor devices 102. The system 100 can analyze complex data arrays, such as multiple distance measurements from radar sensors with multiple output points.

In some examples, the system supports configuration of multiple monitoring zones within a single vessel, where each zone may be monitored by the same or different types of sensors. For example, a vertical tank may be divided into upper, middle, and lower zones, each monitored by separate distance sensors to provide granular fill level data across the vessel's height. When processing multi-sensor configurations, the system aggregates measurement data from each zone's sensor and applies zone-specific lookup tables to determine localized fill percentages. The system may then use weighted algorithms to calculate an overall vessel fill percentage based on the individual zone measurements and vessel geometry.

In some examples, the GUI enables configuration of zone-specific parameters including zone boundaries, sensor mounting positions, and measurement thresholds. For each zone, users can specify independent sensor types and calibration settings while maintaining synchronized data processing across the entire vessel.

In some examples, the system implements cross-validation between zone sensors to ensure measurement consistency. When discrepancies are detected between zone measurements, the system can apply correction factors or generate alerts for potential sensor misalignment or calibration issues.

The vessel configuration information 204 define physical and operational characteristics of the vessel 202. These properties are stored and managed by the configuration management 124. The vessel configuration information 204 may include vessel 202 dimensions, vessel 202 shape, strapping chart information, total volume capacity, zone configurations, or tank type. The vessel configuration information 204 serves as inputs to the data processing 208.

The configuration management 124 interfaces with memory 210 to store and retrieve configuration data 212. The configuration management 124 processes vessel configuration information 204 to generate lookup tables that map raw measurement data 206 to fill percentages. In some examples, the configuration management 124 processes strapping chart data to generate comma-separated values (CSV) files for configuring the lookup tables.

The memory 210 stores configuration data 212, which includes lookup tables, vessel 202 configurations, encryption keys, and processing 216 algorithms. The memory 210 interfaces with both the configuration management 124 and data processing 208 to provide data storage and retrieval functions.

The data processing 208 receives measurement data 206 from the sensor device 102 and configuration data 212 from memory 210. The processing 216 within the data processing 208 executes algorithms to determine the fill percentage of the vessel 202 based on the measurement data 206 and the lookup tables derived from configuration data 212. In some examples, the processing 216 performs data transformations using mathematical formulas for regular geometric vessels 202 or lookup tables for irregularly shaped vessels 202.

The graphical user interface (GUI) 214 displays the processed vessel 202 information to users. The GUI 214 receives processed information from the data processing 208 and presents the fill percentage with vessel 202 identifiers. In some examples, the GUI 214 also provides interfaces for users to input vessel configuration information 204, upload strapping charts, and view historical fill patterns. The GUI 214 may operate on client devices 122 such as desktop computers or mobile devices to facilitate remote monitoring and configuration.

The interconnections between components facilitate data flow through the vessel monitoring system 200. Measurement data 206 flows from sensor device 102 to data processing 208, while configuration data 212 flows between memory 210, configuration management 124, and data processing 208. The processing results flow from data processing 208 to the GUI 214 for presentation to users.

Figure 3:
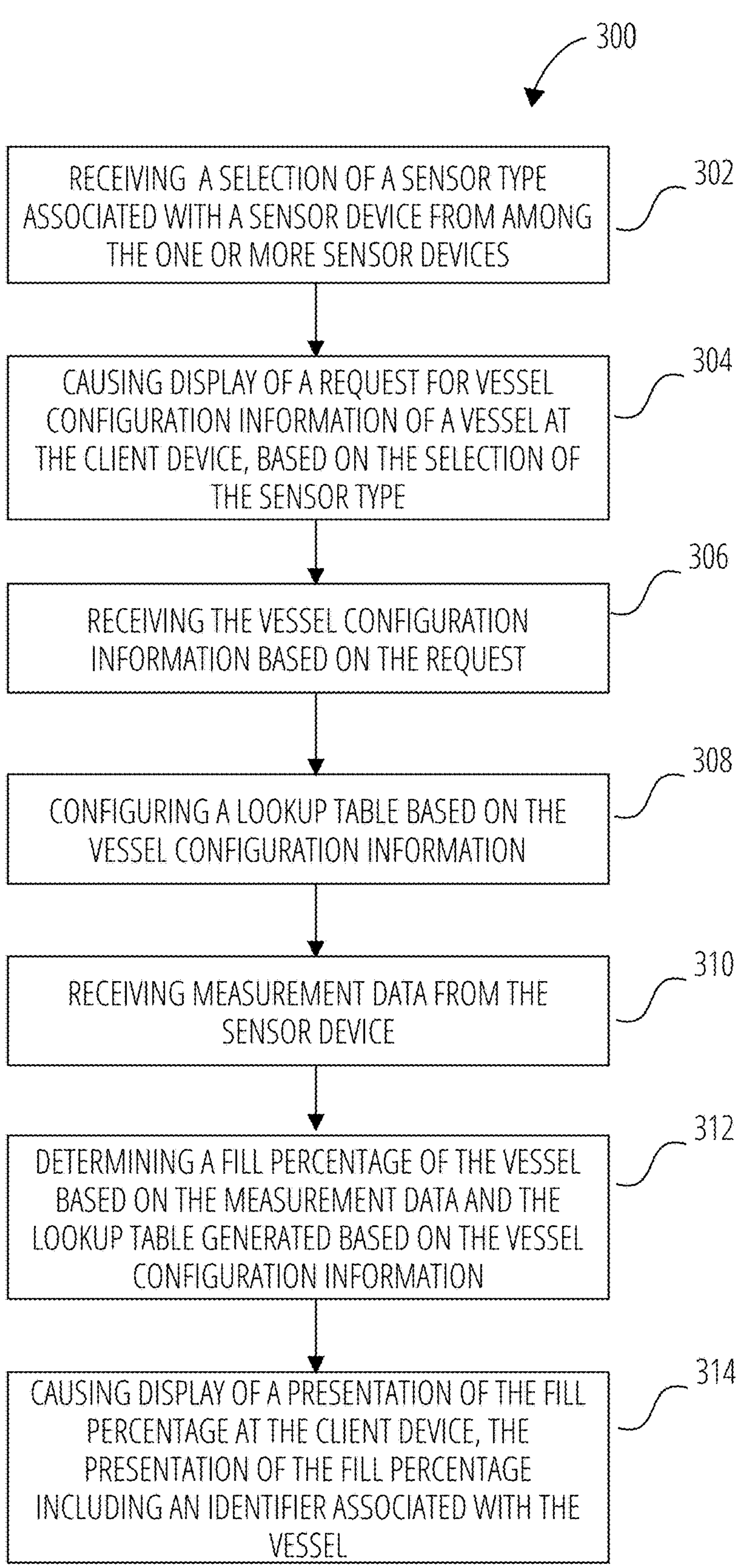
FIG. 3 is a flowchart illustrating method for determining vessel fill levels using configurable sensor mapping, according to some examples.

FIG. 3 is a flowchart illustrating a method 300 for determining vessel 202 fill levels using configurable sensor device 102 mapping, according to some examples.

At operation 302, the client application 126 receives a selection of a sensor type associated with a sensor device 102 from among one or more sensor device 102 through a GUI 214 presented at a client device 122. The sensor type may include radar sensors, ultrasonic sensors, optical time-of-flight sensors, pressure sensors, temperature sensors, voltage sensors, current sensors, magnetic flux sensors, or digital input sensors.

At operation 304, based on the selected sensor type, the system gateway 104 causes display of a request for vessel configuration information 204 at the client device 122. The configuration request adapts to the specific requirements of the selected sensor type. For example, a radar sensor configuration request includes fields for mounting height and beam angle, while a pressure sensor request includes fields for pressure ranges and temperature compensation parameters.

At operation 306, the configuration management 124 receives vessel configuration information 204 based on the request for vessel configuration. For example, the vessel configuration information 204 may include vessel dimensions, vessel shape, strapping chart information, total volume capacity, zone configurations, or tank type.

At operation 308, the data processing system 116 configures a lookup table based on the received vessel configuration information 204, and associated it with a sensor identifier. For a vessel 202 with standard geometries, this may involve mathematical formulas, while irregular shapes may require processing of strapping chart data. In some examples, the configured lookup table is stored in a memory, such as the memory 210, and may be indexed by the sensor identification 602, enabling the system to retrieve and apply the correct vessel-specific conversion parameters whenever measurement data 206 is received from that sensor device 102.

At operation 310, the system 100 receives measurement data 206 from the sensor device 102. The measurement data 206 may comprise distance values, pressure values, temperature values, voltage readings, current measurements, or magnetic flux measurements depending on the sensor type.

At operation 312, the data processing system 116 determines a fill percentage of the vessel 202 by processing the measurement data 206 using the configured lookup table based on the vessel configuration information 204. For pressurized vessels 202, this may involve processing multiple sensor device 102 inputs such as pressure and temperature readings.

At operation 314, the client application 126 causes display of the fill percentage at the client device 122, including an identifier associated with the monitored vessel 202. The presentation may include additional information such as total volume calculations and historical fill level trends.

Figure 4:
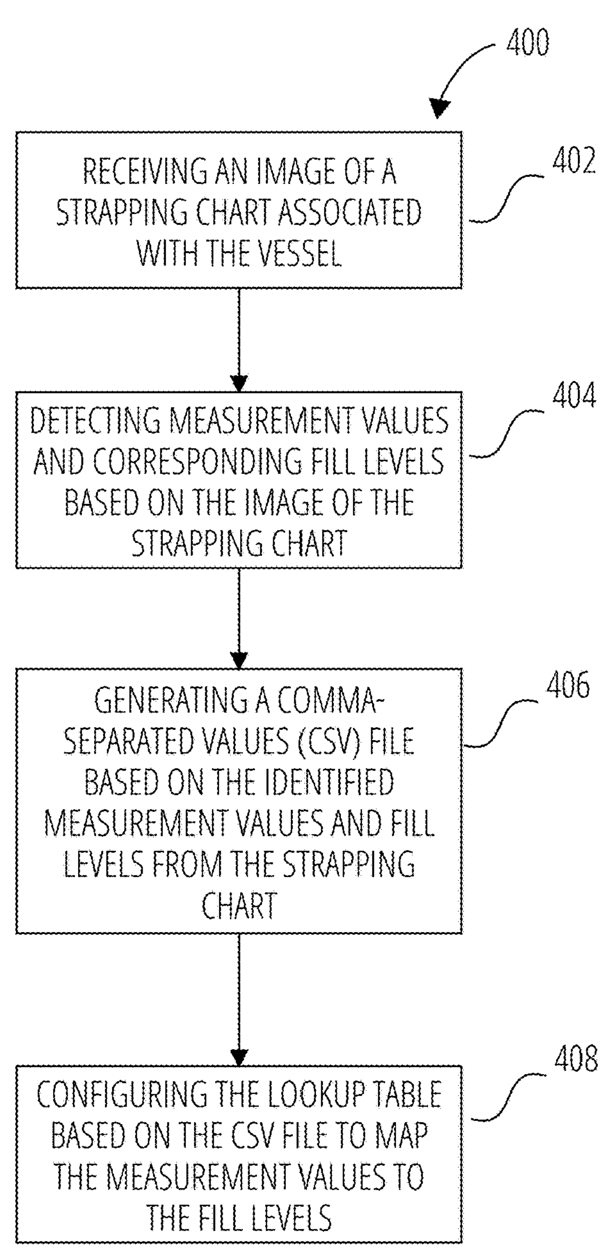
FIG. 4 is a flowchart illustrating a method for processing strapping chart data to configure vessel monitoring parameters, according to some examples.

FIG. 4 is a flowchart illustrating a method 400 for processing strapping chart data to configure vessel 202 monitoring parameters, according to some examples.

Figure 6:
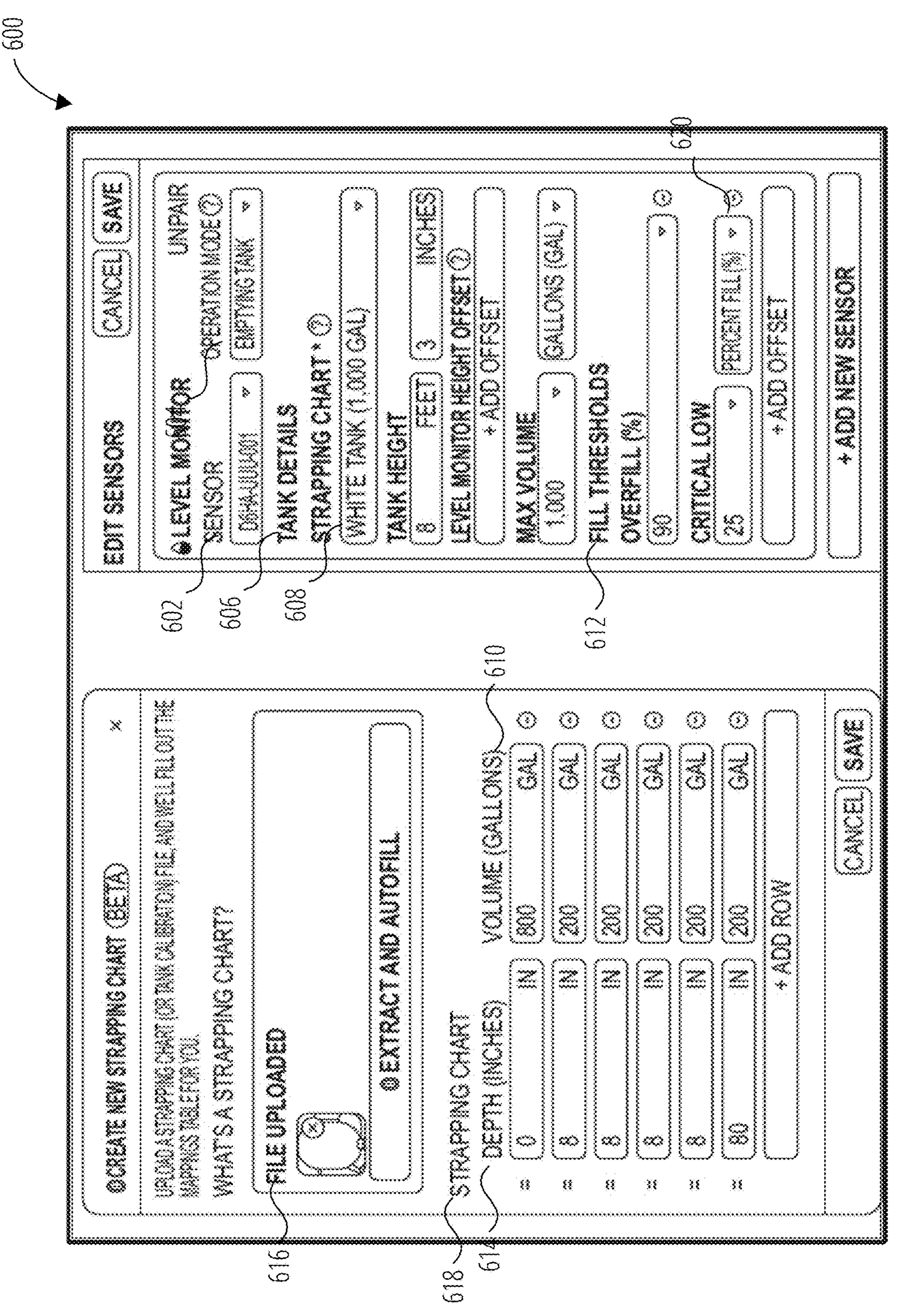
FIG. 6 is a user interface diagram illustrating a vessel configuration interface with strapping chart data entry capabilities, according to some examples.
Figure 7:
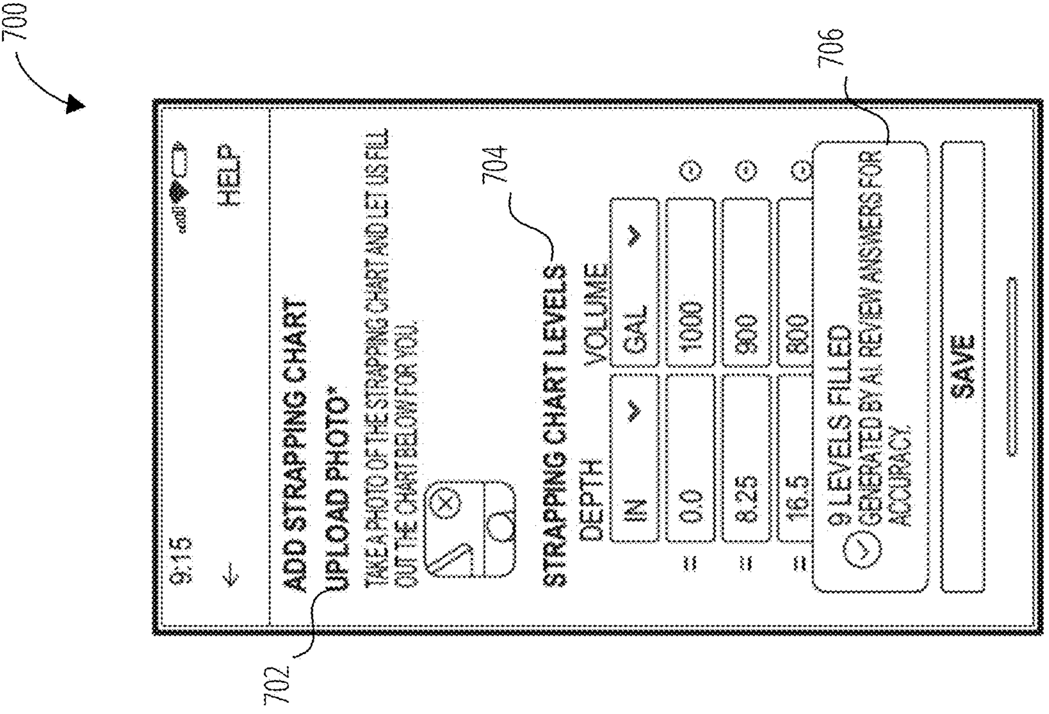
FIG. 7 is a user interface diagram illustrating a mobile interface for capturing and processing strapping chart information, according to some examples.
Figure 7:
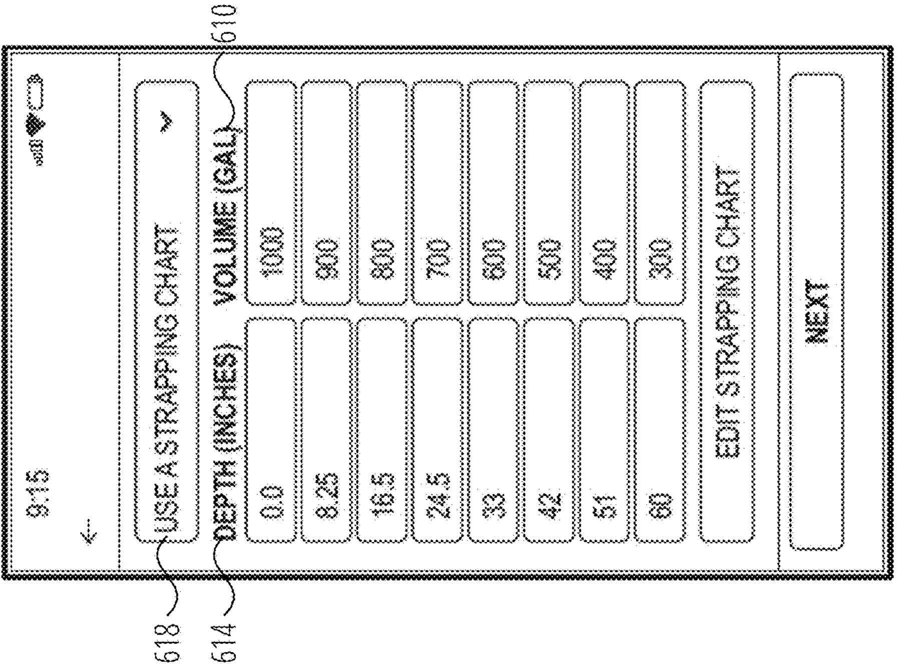

At operation 402, the client application 126 receives an image of a strapping chart through the graphical user interface (GUI) 214. The strapping chart may be uploaded through the file upload component 616 component in the web interface, as depicted in FIG. 6, or captured using the image capture prompt 702 in the mobile interface, as depicted in FIG. 7.

At operation 404, the data processing system 116 analyzes the strapping chart image using artificial intelligence to detect measurement values and corresponding fill levels. The AI processing examines the image to identify data points, measurement scales, and volume markings.

At operation 406, the configuration management 124 generates a CSV file based on the measurement values. The CSV file standardizes the measurement-to-fill-level mappings in a format that can be processed by the system. The data may include depth measurement 614 correlated with volume measurement 610, creating discrete data points for the lookup table.

At operation 408, the data processing system 116 configures the lookup table based on the generated CSV file to map the measurement values to the fill levels. The lookup table establishes direct mappings between sensor measurement values and corresponding fill levels. In some examples, validation checks may be performed comparing the extracted values against known vessel 202 parameters such as maximum vessel capacity 808. The configured lookup table integrates with the vessel configuration information 204 stored in memory 210, allowing the data processing 208 component to convert incoming sensor device 102 measurements into fill percentages. The AI-generated data indicator 706 notifies users when values have been automatically extracted, enabling verification of the processed data before finalizing the configuration.

Figure 5:
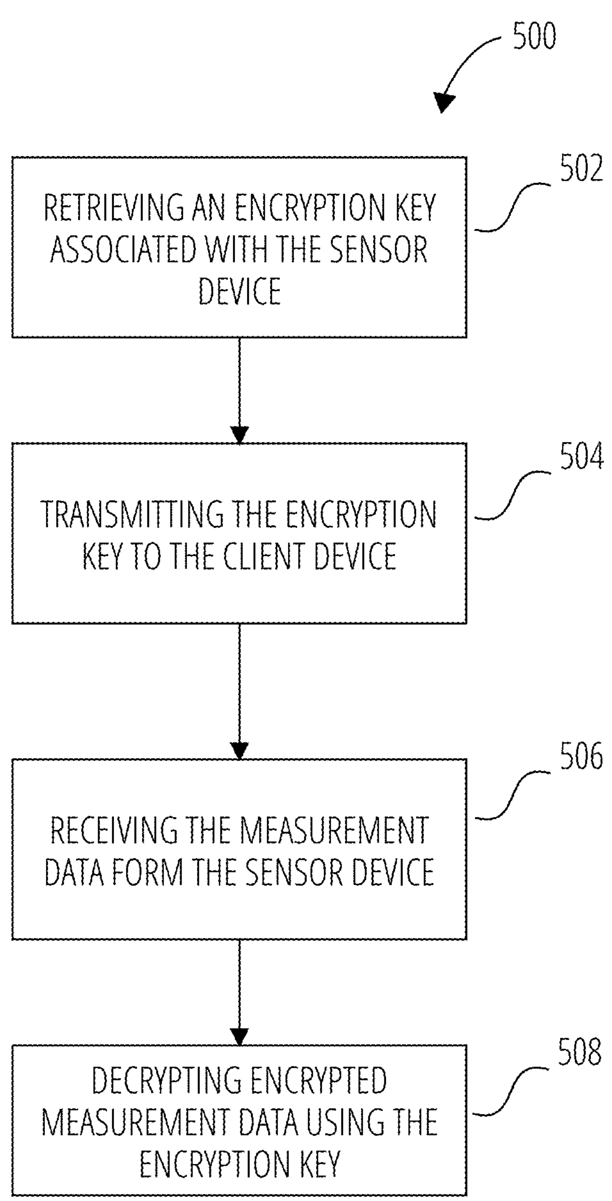
FIG. 5 is a flowchart illustrating encryption key management method for secure sensor communications, according to some examples.

FIG. 5 is a flowchart illustrating encryption key management method 500 for secure sensor device 102 communications, according to some examples.

At operation 502, the server system 108 retrieves an encryption key associated with the sensor device 102. The encryption key enables secure communication between the sensor device 102 and authorized client devices 122. In some examples, each sensor device 102 maintains a unique private key certificate used for encrypting measurement data 206.

At operation 504, the system gateway 104 transmits the encryption key to the client device 122. In some examples, the client application 126 may establish secure communications with the sensor device 102 for accessing real-time measurements.

At operation 506, the system 100 receives measurement data 206 from the sensor device 102. The measurement data 206 is encrypted using the sensor's private key to prevent unauthorized access.

At operation 508, the data processing system 116 decrypts the encrypted measurement data 206 using the encryption key. The decrypted data may include distance measurements, pressure readings, temperature values, or other sensor-specific measurements that are then processed to determine vessel 202 fill levels. In some examples, the decryption process allows only authorized client devices 122 can interpret the sensor device 102 readings.

The encryption key management operations integrate with the broader vessel 202 monitoring system 100, enabling secure access to real-time measurements while maintaining data security across the distributed sensor device 102 network. In some examples, both web-based monitoring and mobile field access through authenticated client devices 122 are supported.

FIG. 6 is a user interface diagram illustrating a vessel configuration interface 600 with strapping chart 618 data entry capabilities, according to some examples. In some examples, the vessel configuration interface 600 provides an environment for users to configure sensor device 102 to vessel 202 relationships and establish measurement mappings.

In some examples, the vessel configuration interface 600 displays a file upload component 616 that can allow processing of a strapping chart 618. In some examples the strapping chart 618 format may include CSV files, spreadsheet documents, images of physical charts, photographs of vessel 202 documentation, and technical drawings. In some examples, the system 100 analyzes and extracts critical dimensions, reference points, and calibration information for configuring lookup tables, from the technical drawings. In some examples, existing strapping charts 618 may be uploaded to map measurement data 206 to fill percentages 620.

In some examples, the strapping chart identifier 608 indicates vessel 202 configuration. The sensor identification 602 displays sensor identification 602 that corresponds to the specific device attached to the vessel 202. The operation mode 604 allows configuration of sensor device 102 operational patterns. In some examples, the operation mode 604 allows configuration of sensor device 102 operational patterns through a dropdown menu.

In some examples, the tank details 606 section provides vessel 202 parameter configuration, including a volume measurement 610 for maximum capacity and depth measurement 614 fields for specifying tank dimensions. For example, when a strapping chart 618 file is uploaded, a data table displaying depth measurements 614 to volume measurements 610 mapping is automatically generated below the main configuration fields. This table provides multiple rows of measurement pairs, with each row containing a depth value in the left column and its corresponding volume value in the right column. For example, users can edit individual cells within these rows to fine-tune the mapping data and can add new rows through an "Add row" button for manual data entry or extension of automatically extracted data. The interface also provides an "Add offset" button that enables configuration of sensor mounting position adjustments to account for installation variations.

Fill level thresholds 612 implement alert configurations, with numeric input fields for setting precise percentage values for different alert conditions. The interface provides specific threshold settings for "Overfill (%)" conditions and "Critical low" conditions. These thresholds trigger notifications when vessel 202 contents reach the specified levels. When these thresholds are crossed, the system 100 can generate alerts through multiple notification channels based on user configuration preferences.

FIG. 7 is a user interface diagram illustrating a mobile interface for capturing and processing strapping chart 618 information, according to some examples.

The mobile strapping chart interface 700 displays a field-oriented configuration workflow for capturing and processing vessel 202 measurement data 206, including an image capture prompt 702 for photographing existing strapping charts 618, a structured strapping chart data table 704 showing extracted depth measurement 614 and volume measurement 610 pairs, and an AI-generated data indicator 706.

The image capture prompt 702 contains a prompt allowing for the uploading of an image. In some examples, this image capture prompt 702 allows technicians to capture an image of an existing strapping chart 618. In some examples, the strapping chart 618 may be physically attached to the vessel 202, such as a manufacturer plate or label, or available in associated documentation maintained at the installation site.

In some examples, the mobile strapping chart interface 700 supports field validation during sensor device 102 installation by allowing technicians to capture images of current fill levels and manually enter observed measurements to establish baseline readings and verify configuration accuracy.

The strapping chart data table 704 displays measurement data 206 in a table format with multiple columns. In some examples, the strapping chart data table 704 displays measurement data 206 with two columns. The left column displays the depth measurement 614 and the right column displays corresponding volume measurements 610.

In some examples, an AI-generated data indicator 706 appears with the measurement table, alerting users that the displayed values were extracted through automated processing. In some examples, the mobile strapping chart interface 700 includes edit controls next to each measurement pair, allowing users to modify any values that may have been incorrectly extracted by the AI processing system.

In some examples, the mobile strapping chart interface 700 supports secure real-time monitoring through a 'live mode' feature. In some examples an encryption key is exchanged between the mobile device and sensor device 102 before establishing the data stream, enabling field technicians to observe immediate measurement changes during calibration while maintaining security.

Figure 8:
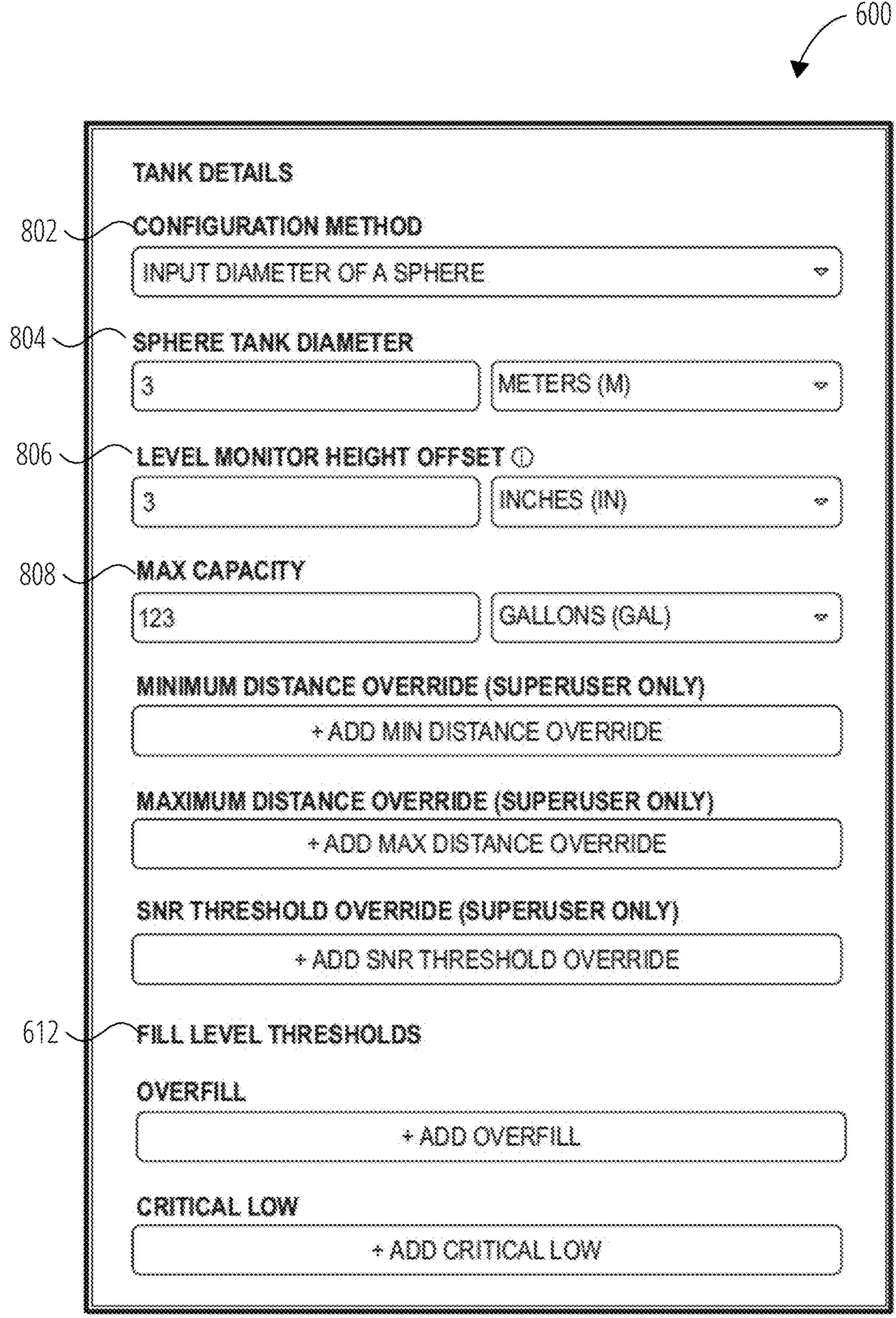
FIG. 8 is a user interface diagram illustrating vessel configuration options for tank parameters, according to some examples.

FIG. 8 is a user interface diagram illustrating vessel 202 configuration options for tank parameters, according to some examples.

The configuration method selector 802 presents a specialized configuration method allowing for geometric configuration for a specific vessel 202 type. In this example, the configuration method selector 802 displays "input diameter of a sphere vessel." In some examples, the configuration method selector 802 includes additional input selections, including "Input dimensions of a horizontal cylinder vessel," "Input dimensions of a vertical cylinder vessel," "Input dimensions of a rectangular vessel," and "Use custom strapping chart" to accommodate the configuration of various vessel 202 types. Each configuration method selection dynamically updates the subsequent form fields to collect the specific parameters relevant to that vessel 202 geometry.

The vessel dimension 804 displays dimension inputs based on the selected vessel 202 shape. The dimension inputs are automatically updated to correlate to the appropriate dimension options for the selected vessel 202 shape. In some examples, such as for horizontal cylinder vessels 202, length and diameter inputs are displayed. In other examples, such as for vertical cylinder vessels 202, height and diameter inputs are displayed. In other examples, such as for rectangular vessels 202, length, width, and height inputs are displayed. The interface maintains consistent measurement unit selection capabilities across all dimension fields, allowing users to input values in their preferred measurement system.

The sensor position offset 806 may allow calibration of the sensor device 102's mounting position relative to the vessel 202 reference point. This positioning data remains consistent across different vessel 202 geometries as sensor device 102 installation may utilize a calibrated mounting position to convert distance measurements into volume calculations. The offset value compensates for scenarios where the sensor device 102 cannot be mounted directly at the vessel 202's reference point, ensuring accurate measurements despite installation constraints. The interface visually represents this offset with a vertical positioning indicator showing the relationship between the sensor device 102 mounting position and the vessel 202.

In some examples, the maximum vessel capacity 808 allows for numerical input for total capacity in volume units to be input, serving as a reference point for percentage calculations across all vessel 202 types.

The fill level thresholds 612 section provides threshold configuration with "Overfill" and "Critical Low" settings through button controls. The fill level thresholds 612 establish the boundary conditions for normal operation and trigger alerts when vessel 202 contents exceed or fall below the specified levels. In some examples, the vessel configuration interface 600 allows users to selectively enable the specific alert types needed for each vessel 202's operational requirements.

Figure 9:
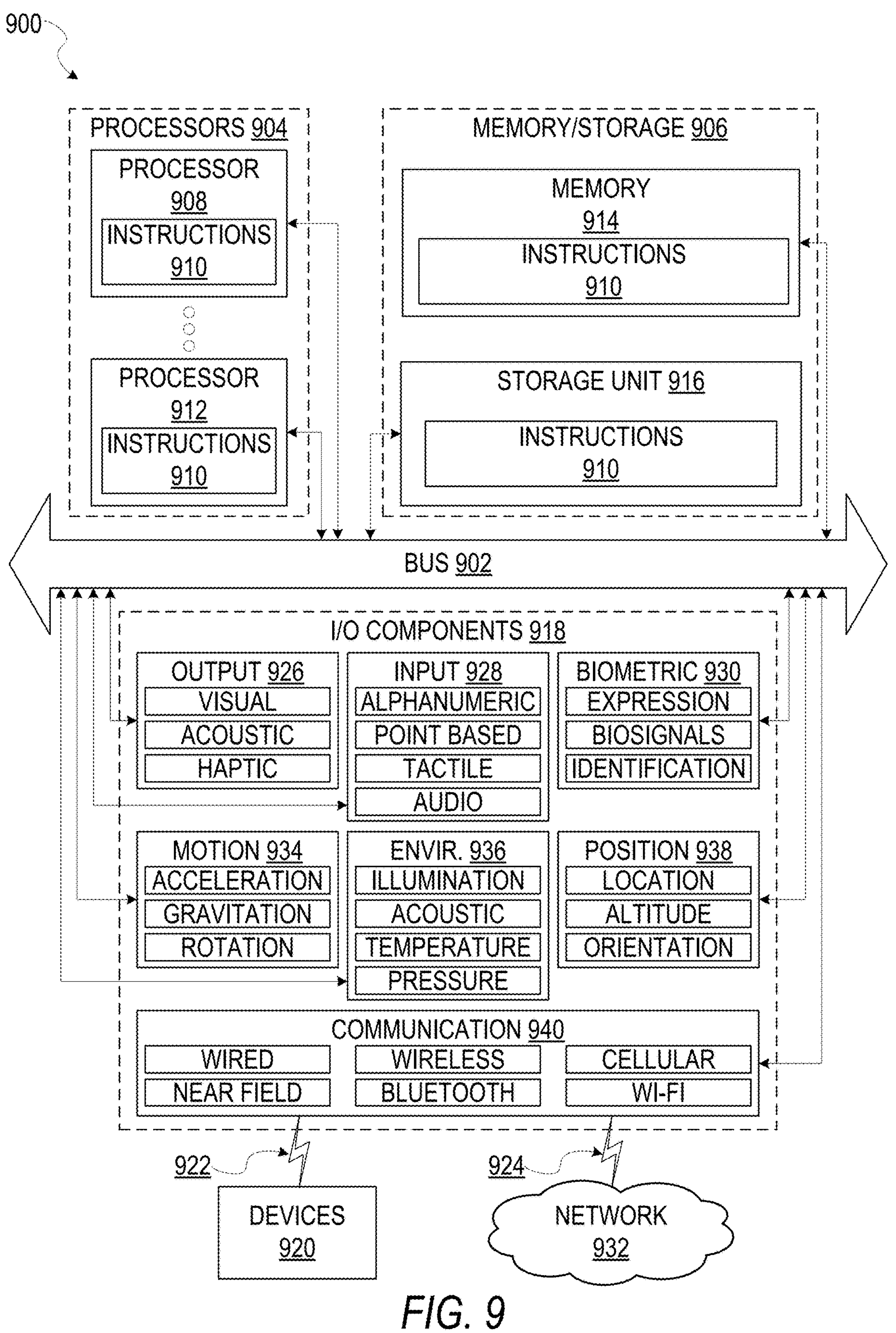
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910(e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), a cellular telephone, a smart phone, a mobile device, a wearable device (e.g., a smart watch), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect authorized user identities for sensor access (e.g., fingerprint identification, facial identification), validate field technician credentials during sensor installation and configuration, and authenticate users for accessing real-time measurement data through the mobile interface. These biometric authentication capabilities support the secure access requirements for sensor configuration, live monitoring mode activation, and encryption key management described in the system. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

EXAMPLES

Example 1 is a system comprising: a memory; one or more sensor devices; and at least one hardware processor coupled to the memory and comprising instructions that causes the system to perform operations comprising: receiving, through a graphical user interface (GUI) presented at a client device, a selection of a sensor type associated with a sensor device from among the one or more sensor devices; causing display of a request for vessel configuration information of a vessel at the client device, based on the selection of the sensor type; receiving the vessel configuration information based on the request; configuring a lookup table based on the vessel configuration information; receiving measurement data from the sensor device; determining a fill percentage of the vessel based on the measurement data and the lookup table generated based on the vessel configuration information; and causing display of a presentation of the fill percentage at the client device, the presentation of the fill percentage including an identifier associated with the vessel.

In Example 2, the subject matter of Example 1, wherein the vessel configuration information comprises at least one of: vessel dimensions; a vessel shape; strapping chart information; total volume capacity; zone configurations; or tank type.

In Example 3, the subject matter of any one or more of Examples 1-2, wherein the receiving the vessel configuration information includes: receiving, through the GUI, an image of a strapping chart associated with the vessel; detecting measurement values and corresponding fill levels based on the image of the strapping chart; generating a comma-separated values (CSV) file based on the identified measurement values and fill levels from the strapping chart; and configuring the lookup table based on the CSV file, wherein the lookup table maps the measurement values to the fill levels.

In Example 4, the subject matter of any one or more of Examples 1-3, wherein the measurement data comprises at least one of: a distance value; a pressure value; a temperature value; a voltage; a current; or magnetic flux measurements.

In Example 5, the subject matter of any one or more of Examples 1-4, wherein the sensor type comprises at least one of: a radar sensor; an ultrasonic sensor; an optical time-of-flight sensor; a pressure sensor; a temperature sensor; a voltage sensor; a current sensor; a magnetic flux sensor; or a digital input sensor.

In Example 6, the subject matter of any one or more of Examples 1-5, wherein the operations further comprise: tracking a total volume of content in the vessel based on the fill percentage and the vessel configuration information; monitoring changes in the total volume over time to identify content ingress and egress events; and generating a report based on the monitored changes in total volume, wherein the report indicates patterns of content ingress and egress over time.

In Example 7, the subject matter of any one or more of Examples 1-6, wherein the receiving the vessel configuration information includes: receiving, through the GUI, an image depicting the vessel; analyzing the image using an artificial intelligence (AI) to identify vessel characteristics; determining vessel configuration parameters based on the identified vessel characteristics; selecting the vessel configuration information based on the determined vessel configuration parameters; and configuring the lookup table based on the selected vessel configuration information.

In Example 8, the subject matter of any one or more of Examples 1-7, wherein the operations further comprise: retrieving an encryption key associated with the sensor device; transmitting the encryption key to the client device; receiving the measurement data form the sensor device, wherein the measurement data includes encrypted measurement data; decrypting the encrypted measurement data using the encryption key; and determining the fill percentage based on the decrypted measurement data.

In Example 9, the subject matter of any one or more of Examples 1-8, wherein the operations further comprise: receiving a strapping chart associate with the vessel; extracting measurement values from the strapping chart; and generating a lookup table based on the measurement values.

Example 10 is a method comprising: receiving, through a graphical user interface (GUI) presented at a client device, a selection of a sensor type associated with a sensor device from among the one or more sensor devices; causing display of a request for vessel configuration information of a vessel at the client device, based on the selection of the sensor type; receiving the vessel configuration information based on the request; configuring a lookup table based on the vessel configuration information; receiving measurement data from the sensor device; determining a fill percentage of the vessel based on the measurement data and the lookup table generated based on the vessel configuration information; and causing display of a presentation of the fill percentage at the client device, the presentation of the fill percentage including an identifier associated with the vessel.

In Example 11, the subject matter of Example 10, wherein the vessel configuration information comprises at least one of: vessel dimensions; a vessel shape; strapping chart information; total volume capacity; zone configurations; or tank type.

In Example 12, the subject matter of any one or more of Examples 10-11, wherein the receiving the vessel configuration information includes: receiving, through the GUI, an image of a strapping chart associated with the vessel; detecting measurement values and corresponding fill levels based on the image of the strapping chart; generating a comma-separated values (CSV) file based on the identified measurement values and fill levels from the strapping chart; and configuring the lookup table based on the CSV file, wherein the lookup table maps the measurement values to the fill levels.

In Example 13, the subject matter of any one or more of Examples 10-12, wherein the measurement data comprises at least one of: a distance value; a pressure value; a temperature value; a voltage; a current; or magnetic flux measurements.

In Example 14, the subject matter of any one or more of Examples 10-13, wherein the sensor type comprises at least one of: a radar sensor; an ultrasonic sensor; an optical time-of-flight sensor; a pressure sensor; a temperature sensor; a voltage sensor; a current sensor; a magnetic flux sensor; or a digital input sensor.

In Example 15, the subject matter of any one or more of Examples 10-14, wherein the operations further comprise: tracking a total volume of content in the vessel based on the fill percentage and the vessel configuration information; monitoring changes in the total volume over time to identify content ingress and egress events; and generating a report based on the monitored changes in total volume, wherein the report indicates patterns of content ingress and egress over time.

In Example 16, the subject matter of any one or more of Examples 10-15, wherein the receiving the vessel configuration information includes: receiving, through the GUI, an image depicting the vessel; analyzing the image using an artificial intelligence (AI) to identify vessel characteristics; determining vessel configuration parameters based on the identified vessel characteristics; selecting the vessel configuration information based on the determined vessel configuration parameters; and configuring the lookup table based on the selected vessel configuration information.

In Example 17, the subject matter of any one or more of Examples 10-16, wherein the operations further comprise: retrieving an encryption key associated with the sensor device; transmitting the encryption key to the client device; receiving the measurement data form the sensor device, wherein the measurement data includes encrypted measurement data; decrypting the encrypted measurement data using the encryption key; and determining the fill percentage based on the decrypted measurement data.

Example 18 is a non-transitory computer-readable storage medium comprising instructions that, when executed by one or more processors, cause the one or more processors to: receiving, through a graphical user interface (GUI) presented at a client device, a selection of a sensor type associated with a sensor device from among one or more sensor devices; causing display of a request for vessel configuration information of a vessel at the client device, based on the selection of the sensor type; receiving the vessel configuration information based on the request; configuring a lookup table based on the vessel configuration information; receiving measurement data from the sensor device; determining a fill percentage of the vessel based on the measurement data and the lookup table generated based on the vessel configuration information; and causing display of a presentation of the fill percentage at the client device, the presentation of the fill percentage including an identifier associated with the vessel.

In Example 19, the subject matter of Example 18, wherein the vessel configuration information comprises at least one of: vessel dimensions; a vessel shape; strapping chart information; total volume capacity; zone configurations; or tank type.

In Example 20, the subject matter of any one or more of Examples 18-19, wherein the receiving the vessel configuration information includes: receiving, through the GUI, an image of a strapping chart associated with the vessel; detecting measurement values and corresponding fill levels based on the image of the strapping chart; generating a comma-separated values (CSV) file based on the identified measurement values and fill levels from the strapping chart; and configuring the lookup table based on the CSV file, wherein the lookup table maps the measurement values to the fill levels.

The present disclosure provides systems and methods for determining vessel fill levels using configurable sensor mapping and secure data processing. The systems and methods enable accurate measurement and monitoring of fill levels across vessels with varying configurations through integration of multiple sensor types, automated processing of vessel configuration information, and secure real-time data access.

The system provides several key advantages: The system adapts to diverse vessel configurations and sensor types through configurable lookup tables and dynamic interfaces, processing multiple sensor technologies including radar, ultrasonic, optical, pressure, temperature, voltage, current, and magnetic flux sensors, enabling measurement across various vessel types and conditions, with configuration interfaces that dynamically adjust based on selected sensor types and vessel geometries to present relevant parameters and setup options. Additionally, the system enables complete sensor configuration and monitoring in remote locations through mobile-optimized interfaces and secure data transmission, allowing field technicians to photograph existing strapping charts, process vessel documentation, and validate configurations directly at installation sites without requiring return trips to office environments, addressing the technical challenge of configuring and monitoring vessels located in remote locations where obtaining accurate measurements is difficult. Furthermore, the system implements artificial intelligence to automate the processing of vessel documentation and measurement data, with AI capabilities that extract measurement values from strapping charts, process technical drawings, and generate lookup tables automatically, reducing manual data entry, improving accuracy, and enabling processing of irregular vessel geometries where mathematical formulas cannot be directly applied.

Through integration of these components and capabilities, the system provides a solution for vessel fill level monitoring that addresses the technical challenges of accurate measurement across diverse vessel configurations and deployment scenarios.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system comprising:

a memory;

one or more sensor devices; and at least one hardware processor coupled to the memory and comprising instructions that causes the system to perform operations comprising:

receiving, through a graphical user interface (GUI) presented at a client device, a selection of a sensor type associated with a sensor device from among the one or more sensor devices;

responsive to the selection of the sensor type, causing display of a request for vessel configuration information of a vessel at the client device;

receiving, from the client device responsive to the request for vessel configuration information, an image that includes a depiction of a strapping chart associated with the vessel;

processing the image to extract measurement values and corresponding fill levels based on the depiction of the strapping chart:

generating a comma-separated values (CSV) file based on the extracted measurement values and the corresponding fill levels;

configuring a lookup table that comprises a mapping of the measurement values to the fill levels based on the image received from the client device;

receiving measurement data from the sensor device;

determining a fill percentage of the vessel based on the measurement data and the lookup table generated based on the vessel configuration information; and causing display of a presentation of the fill percentage at the client device, the presentation of the fill percentage including an identifier associated with the vessel.

2. The system of claim 1, wherein the vessel configuration information comprises at least one of:

vessel dimensions;

a vessel shape;

strapping chart information;

total volume capacity;

zone configurations; or tank type.

3. The system of claim 1, wherein the measurement data comprises at least one of:

a distance value;

a pressure value;

a temperature value;

a voltage;

a current; or a magnetic flux measurements.

4. The system of claim 1, wherein the sensor type comprises at least one of:

a radar sensor;

an ultrasonic sensor;

an optical time-of-flight sensor;

a pressure sensor;

a temperature sensor;

a voltage sensor;

a current sensor;

a magnetic flux sensor; or a digital input sensor.

5. The system of claim 1, wherein the operations further comprise:

tracking a total volume of content in the vessel based on the fill percentage and the vessel configuration information;

monitoring changes in the total volume over time to identify content ingress and egress events; and generating a report based on the monitored changes in total volume, wherein the report indicates patterns of content ingress and egress over time.

6. The system of claim 1, wherein the image comprises an image depicting the vessel, and the receiving the vessel configuration information includes:

analyzing the image using an artificial intelligence (AI) to identify vessel characteristics;

determining vessel configuration parameters based on the identified vessel characteristics;

selecting the vessel configuration information based on the determined vessel configuration parameters; and configuring the lookup table based on the selected vessel configuration information.

7. The system of claim 1, wherein the operations further comprise:

retrieving an encryption key associated with the sensor device;

transmitting the encryption key to the client device;

receiving the measurement data form the sensor device, wherein the measurement data includes encrypted measurement data;

decrypting the encrypted measurement data using the encryption key; and determining the fill percentage based on the decrypted measurement data.

8. A method comprising:

receiving, through a graphical user interface (GUI) presented at a client device, a selection of a sensor type associated with a sensor device from among the one or more sensor devices;

responsive to the selection of the sensor type, causing display of a request for vessel configuration information of a vessel at the client device;

receiving, from the client device responsive to the request for vessel configuration information, an image that includes a depiction of a strapping chart associated with the vessel;

processing the image to extract measurement values and corresponding fill levels based on the depiction of the strapping chart;

generating a comma-separated values (CSV) file based on the extracted measurement values and the corresponding fill levels;

configuring a lookup table that comprises a mapping of the measurement values to the fill levels based on the image received from the client device;

receiving measurement data from the sensor device;

determining a fill percentage of the vessel based on the measurement data and the lookup table generated based on the vessel configuration information; and causing display of a presentation of the fill percentage at the client device, the presentation of the fill percentage including an identifier associated with the vessel.

9. The method of claim 8, wherein the vessel configuration information comprises at least one of:

vessel dimensions;

a vessel shape;

strapping chart information;

total volume capacity;

zone configurations; or tank type.

10. The method of claim 8, wherein the measurement data comprises at least one of:

a distance value;

a pressure value;

a temperature value;

a voltage;

a current; or a magnetic flux measurements.

11. The method of claim 8, wherein the sensor type comprises at least one of:

a radar sensor;

an ultrasonic sensor;

an optical time-of-flight sensor;

a pressure sensor;

a temperature sensor;

a voltage sensor;

a current sensor;

a magnetic flux sensor; or a digital input sensor.

12. The method of claim 8, wherein the method further comprises:

tracking a total volume of content in the vessel based on the fill percentage and the vessel configuration information;

monitoring changes in the total volume over time to identify content ingress and egress events; and generating a report based on the monitored changes in total volume, wherein the report indicates patterns of content ingress and egress over time.

13. The method of claim 8, wherein the image comprises an image depicting the vessel, and the receiving the vessel configuration information includes:

analyzing the image using an artificial intelligence (AI) to identify vessel characteristics;

determining vessel configuration parameters based on the identified vessel characteristics;

selecting the vessel configuration information based on the determined vessel configuration parameters; and configuring the lookup table based on the selected vessel configuration information.

14. The method of claim 8, wherein the method further comprises:

retrieving an encryption key associated with the sensor device;

transmitting the encryption key to the client device;

receiving the measurement data form the sensor device, wherein the measurement data includes encrypted measurement data;

decrypting the encrypted measurement data using the encryption key; and determining the fill percentage based on the decrypted measurement data.

15. The method of claim 8, further comprising:

receiving a strapping chart associate with the vessel;

extracting measurement values from the strapping chart; and generating a lookup table based on the measurement values.

16. A non-transitory computer-readable storage medium comprising instructions that, when executed by one or more processors, cause the one or more processors to:

receiving, through a graphical user interface (GUI) presented at a client device, a selection of a sensor type associated with a sensor device from among the one or more sensor devices;

responsive to the selection of the sensor type, causing display of a request for vessel configuration information of a vessel at the client device;

receiving, from the client device responsive to the request for vessel configuration information, an image that includes a depiction of a strapping chart associated with the vessel;

processing the image to extract measurement values and corresponding fill levels based on the depiction of the strapping chart;

generating a comma-separated values (CSV) file based on the extracted measurement values and the corresponding fill levels;

configuring a lookup table that comprises a mapping of the measurement values to the fill levels based on the image received from the client device;

receiving measurement data from the sensor device;

determining a fill percentage of the vessel based on the measurement data and the lookup table generated based on the vessel configuration information; and causing display of a presentation of the fill percentage at the client device, the presentation of the fill percentage including an identifier associated with the vessel.

17. The non-transitory computer-readable storage medium of claim 16, wherein the vessel configuration information comprises at least one of:

vessel dimensions;

a vessel shape;

strapping chart information;

total volume capacity;

zone configurations; or tank type.

* * * * *